US005899516A

United States Patent [19]
Fujimura et al.

[11] Patent Number: 5,899,516
[45] Date of Patent: May 4, 1999

[54] RAILWAY WHEEL AND MANUFACTURING METHOD OF THE RAILWAY WHEEL

[75] Inventors: Takashi Fujimura, Nishinomiya; Manao Anjiki, Yamatokoriyama; Taizo Makino, Nishinomiya; Yoshihiro Daitoh, Amagasaki, all of Japan

[73] Assignee: Sumitomo Metal Industries, Ltd., Osaka, Japan

[21] Appl. No.: 08/787,218

[22] Filed: Jan. 22, 1997

[30] Foreign Application Priority Data

Jan. 23, 1996 [JP] Japan .................................. 8-009204

[51] Int. Cl.⁶ ...................................... B60B 37/00
[52] U.S. Cl. .............................. 295/1; 295/30; 148/583; 420/104
[58] Field of Search ............................. 295/1, 8, 21, 22, 295/24, 27, 28, 29, 30, 31.1; 148/583, 333; 420/104

[56] References Cited

U.S. PATENT DOCUMENTS 3,753,789  8/1973  Kucera et al. ..................... 148/583 X
4,170,497  10/1979  Thomas et al. ......................... 148/333
5,533,770  7/1996  Clausmeyer et al. ..................... 295/1

FOREIGN PATENT DOCUMENTS 57-143465  4/1982  Japan .

OTHER PUBLICATIONS

Metals Handbook; Ninth Edition, vol. I; Irons & Steels; American Society Of Metals, 1978.
Mark's Standard Handbook For Engineers; Tenth Edition; Chapter 11, 1996.

*Primary Examiner*—Russell D. Stormer
*Attorney, Agent, or Firm*—Burns, Doane, Swecker & Mathis, LLP

[57] ABSTRACT

A wheel has both wear resistance and heat-crack resistance sufficient for use in a high-speed railway vehicle. The chemical composition of a base steel comprises 0.4 to 0.75 % C, 0.4 to 0.95% Si, 0.6 to 1.2% Mn and less than 0.2% Cr. The wheel has a pearlitic microstructure in a region of at least 50 mm in depth from the tread surface of the wheel. When the tread of the wheel is quenched, a particular cooling process is applied in order to obtain the pearlitic structure.

12 Claims, 6 Drawing Sheets

RAILWAY WHEEL AND MANUFACTURING METHOD OF THE RAILWAY WHEEL

BACKGROUND OF THE INVENTION

1. Field of the Invention

The present invention relates to a railway wheel having excellent wear resistance and heat-crack resistance and to a method of manufacturing such a railway wheel. More particularly, the invention relates to a solid railway wheel having wear resistance and heat-crack resistance which can cope with high speed of an engine, a passenger car, a freight car, and the like and to a method of manufacturing such a railway wheel.

2. Description of Related Art

There are railway wheels (hereinafter, simply referred to as wheels) for an engine, a passenger car, a freight car, and the like having different functions, shapes, and so on. Therefore, wheels of different dimensions, shapes, and steels are used for respective purposes. Since the life of each wheel is usually determined by the degree of wear of the tread and the flange face, it is requested to use a steel which basically has high wear resistance for the wheel.

A solid wheel which is not produced by a shrinkage fit or the like is produced by the following method. First, a molten steel prepared to have predetermined chemical composition is cast in steel ingots having a circular shape of a diameter of about 360 to 450 mm in cross section by ingot making process or continuous casting processes. Each steel ingot is cut so as to have the thickness of about 300 to 500 mm and is formed in an almost wheel shape of the product by processes of forging, rolling, piercing, and the like. After that, heat treatment such as quenching and tempering is performed to the rim. Steps of machining and the like are further performed, thereby finishing it as a product.

Figure 7:
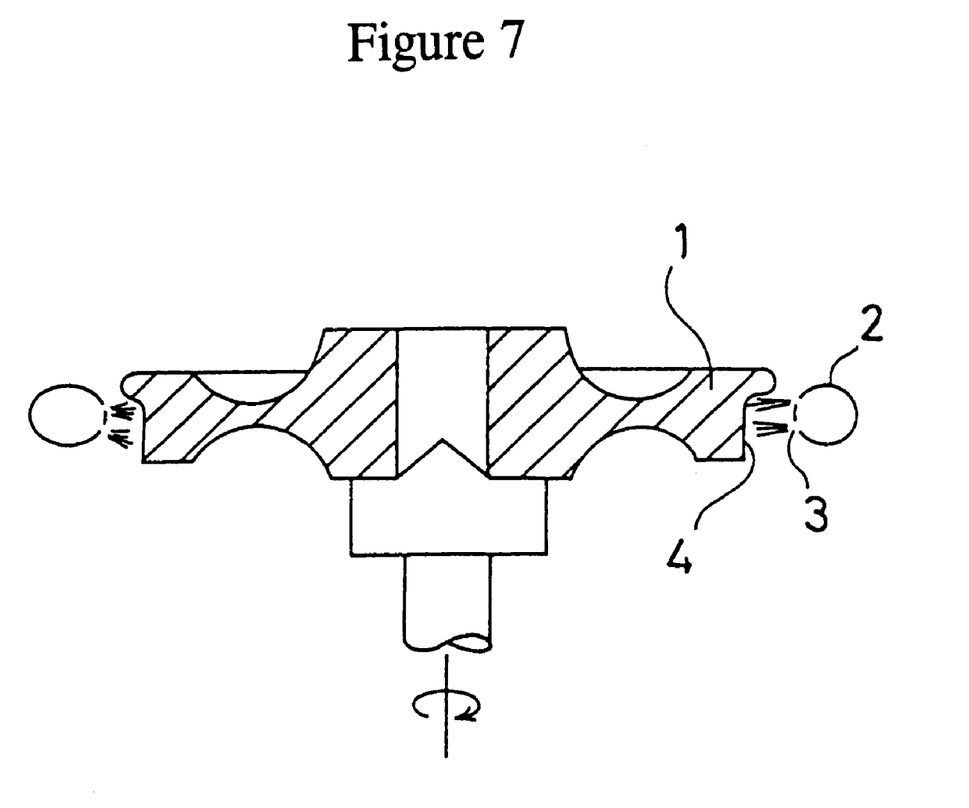
FIG. 7 is a view illustrating a quenching method of a rim of a wheel.

In the quenching step, as shown in FIG. 7, cooling water is injected from nozzles 3 of a quenching ring 2 arranged so as to surround a rim portion 1 of a circular wheel toward a tread 4 and a region from the tread surface 4 to a depth of few tens mm is quenched. By such a quenching, the metallographic structure of an ordinary steel for a wheel becomes pearlitic structure. The wheel having a pearlitic structured region including the tread is wear-resistant and consequently has sufficient properties as a railway wheel ordinarily used.

However, since the speed of the railway vehicle is being increased in recent years, a change such as an increase in a heat generating amount when the brakes are applied occurs. In association with the change, heat-crack of the wheel, which is not conventionally a big issue, becomes an issue. In the increase in speed of the railway vehicle, the heat-crack resistance of the wheel is an important factor in determining the life of the wheel. The heat-crack of the wheel denotes a phenomenon such that tensile stress occurs on the tread and the flange face of the wheel due to thermal stress caused by heat generated by application of the brakes and cracking takes place by repetitive occurrence of the tensile stress. When the heat-crack occurs, the tread and the flange face of the wheel have to be machined to eliminate a portion in which the cracking occurs. The life of the wheel is consequently shortened. Further, when the heat-crack reaches the limit in length, a serious situation such as fracture of the wheel is caused.

The wheel for the recent high-speed railway vehicle is strongly requested to have both of the following properties at the same time:

A. strong wear resistance
B. strong heat-crack resistance

The wear resistance and the heat-crack resistance are contrary properties of steels of the wheels and are generally incompatible properties. The reasons are as follows. In order to enhance the wear resistance, hardness has to be enhanced as much as possible while keeping the pearlitic metallographic structure of the tread portion as it is. However, when an alloying element for improving hardenability is added to increase the hardness, martensitic structure or bainitic structure is accordingly apt to be formed upon quenching or during use of the wheel. The heat-crack is apt to occur during use, so the heat-crack resistance cannot be satisfied. On the other hand, in order to obtain the heat-crack resistance, it is necessary to change the metallographic structure to the tough pearlitic structure and is necessary to reduce the hardness. In this case, however, sufficient wear resistance cannot be obtained. To satisfy both of the wear resistance and the heat-crack resistance at the same time is basically a difficult subject to be achieved.

Hitherto, when greater importance is attached to the wear resistance, some heat-crack resistance is sacrificed and a medium carbon steel (C: 0.65 to 0.75% by weight) is used. The steel is hard and highly wear-resistant and has a relatively high carbon content. When greater importance is attached to the heat-crack resistance, proof stress and wear resistance are ignored to a certain extent and a tough medium carbon steel (C: 0.45 to 0.55%) having a low carbon content and excellent heat-crack resistance is used.

Meanwhile, the applicant of the present invention have already proposed a steel for a wheel which simultaneously satisfies the two properties, that is, the wear resistance and the heat-crack resistance by choosing a proper chemical composition (Japanese Patent Application Laid-Open No. 57-143465). The chemical composition consists of 0.55 to 0.80% by weight C, 0.40 to 1.20% by weight Si, 0.60 to 1.20% by weight Mn, 0.20 to 0.70% by weight Cr, and the rest Fe and other incidental impurities. It is characterized in that the metallographic structure is mainly the pearlitic structure. The Si content of the steel of the wheel lies in a range from 0.4 to 1.2% and the Cr content lies in a range from 0.2 to 0.7% and the contents are high (in case of an ordinary wheel, the Si content is approximately 0.25% and the Cr content is approximately 0.10%). Thermal sensitivity (hardenability) is consequently rather high. Therefore, when heat is much generated when the brakes are applied or the like in a recent high-speed railway vehicle, there is a tendency such that a small quantity of the martensitic structure is formed on the surface layer of the wheel being used. When such a change in metallographic structure occurs, the heat-crack or spalling on the tread occurs or the martensitic structure peels off. Therefore, the life of the wheel is not always satisfactorily long.

When the deformation by wear or heat-crack occurs in the tread portion or the flange portion, the surface layer is removed by machining and the wheel is repeatedly used. In this case, it is desirable from the viewpoint of the life that the metallographic structure and hardness are uniform in the region from the new surface of the condemning limit. In the conventional wheel having a low Si content, since the hardenability is suppressed to obtain the high wear-resistant pearlitic structure, the region in which predetermined hardness is obtained is limited to a region from the tread surface to a relatively shallow point. Consequently, the life of the wheel is not satisfactorily long.

The invention is provided to solve the problems and it is an object of the invention to provide a long-life solid railway wheel and a method of manufacturing such a wheel which simultaneously satisfies both of wear resistance and heat-crack resistance good for use in a high-speed railway vehicle.

SUMMARY OF THE INVENTION

It is an object of the invention to provide a long-life solid railway wheel and a method of manufacturing such a wheel which simultaneously satisfies both of wear resistance and heat-crack resistance satisfactory for use in a high-speed railway vehicle.

The base steel of the wheel of the present invention contains, by weight,: 0.4% to 0.75% C; 0.4% to 0.95% Si; 0.6% to 1.2% Mn; and less than 0.2% Cr. Especially, Cr preferably lies within a range from 0.05% to less than 0.2% and more preferably within a range from 0.07% to less than 0.15%. It is characterized in that the wheel has pearlitic structure in a region of at least 50 mm in depth from the tread surface of the wheel.

Since the relatively high Si content and the relatively low Cr content are combined, the base steel has proper hardenability as a steel for a wheel. Therefore, the stable pearlitic structure, in which hardness is high and uniform and the structure change is not caused easily even if heat is generated when the brakes are applied, can be formed in a wide region from the tread surface to a depth of 50 mm or deeper.

The method of manufacturing the wheel of the invention is characterized by combination of the chemical composition of the base steel and a quenching of the tread portion of the wheel. That is, when the tread of the wheel made of the steel of the above chemical composition is quenched, for example, the following cooling process is used. A process to interrupt or weaken a cooling operation is performed at a stage before the temperature of the tread of the wheel drops to a pearlitic transformation start temperature in a continuous cooling transformation curve diagram. Thus, the pearlitic structure can be obtained without causing the martensitic transformation or bainitic transformation. The wheel having the pearlitic structure can be stably manufactured with high productivity on a commercial scale.

The railway wheel according to the invention and the railway wheel obtained according to the manufacturing method of the invention have excellent heat-crack resistance and wear resistance in a region from the tread surface of the wheel to a depth of 50 mm or deeper. Therefore, not only fracture resistance is excellent but also the life is long, so that the wheel is very safe and some steps required for maintenance can be also reduced. The wheels are especially suitable for use in a recent high-speed railway vehicle.

BRIEF DESCRIPTION OF THE DRAWINGS

FIG. 1 is a diagram schematically showing the relation of a pearlite transformation start curve Ps, a pearlitic transformation finish curve Pf, a bainitic transformation start curve Bs, a bainitic transformation finish curve Bf, a martensitic transformation curve Ms, and a cooling curve of a steel for a conventional wheel, in which

FIG. 4 is a diagram showing the relation between time elapsed from the start of cooling in quenching of a wheel of the invention and temperature at a position of depth 5 mm from the tread surface, in which (a), (b), and (c) illustrate measurement results of wheel numbers 1, 2, and 3, respectively;

FIG. 6 is a diagram showing change in Rockwell hardness in the depth direction from the tread of the rim of a wheel, in which (a), (b), and (c) illustrate measurement results of wheel numbers 1, 2, and 3, respectively.

DETAILED DESCRIPTION

The solid railway wheel of the invention has excellent wear resistance and heat-crack resistance, which is made of the steel comprising the following chemical composition and which has pearlitic structure in a region of at least 50 mm in depth from the tread surface of the wheel:

C: 0.4% to 0.75%
Si: 0.4% to 0.95%
Mn: 0.6% to 1.2%
Cr: less than 0.2%
P: 0.03% or less
S: 0.03% or less
balance: Fe and incidental impurities
wherein % means % by weight.

An especially preferable content of Cr is 0.05% to less than 0.2% by weight more preferably 0.07% to 0.15% by weight. A preferable Si content is 0.6% to 0.95% by weight.

The railway wheel of the present invention is manufactured by combination of the base steel having the above chemical composition and a following quenching and cooling of a tread portion of the wheel. The tread portion of the wheel is quenched by the continuous cooling processes comprising the following (1) and (2):

(1) a process for interrupting or weakening a cooling operation at a stage before the temperature of the tread portion of the wheel drops to a pearlitic transformation start temperature in a continuous cooling transformation curve diagram.

(2) a process for further cooling.

Instead of the above continuous cooling process, a following continuous cooling processes comprising the following ①, ②, and ③ can be used:

① a process for cooling on condition that a cooling curve of the tread portion of the wheel passes a pearlite formation region in a continuous cooling transformation curve diagram.

② a process for interrupting or weakening a cooling operation at a stage before the temperature of the tread portion of the wheel drops to a martensitic transformation temperature.

③ a process for further cooling.

In order to accomplish the foregoing subjects, the inventors have studied to develop a long-life wheel from two viewpoints of a chemical composition of a steel for the wheel and a quenching method of the tread in the following manner. The pearlitic structure which has predetermined hardness to secure wear resistance and can suppress deterioration in heat-crack resistance is provided and a region from the tread surface to a deep point has almost uniform hardness and pearlitic structure. As a result, the following knowledge was obtained.

(a) It is desirable that a steel for a wheel has properties to obtain proper hardenability (thermal sensitivity) and pearlitic structure.

(b) In order to have the properties of (a), it is desirable that a rather small and proper quantity of Cr is contained and a rather large and proper quantity of Si is contained in the chemical composition of the steel for the wheel.

(c) By using a quenching method whereby the steel satisfying the conditions of (a) and (b) can have the pearlitic structure without forming martensite near the tread portion, a region from the tread surface to a deep point can have an almost perfect pearlitic structure and uniform hardness.

(d) It is desirable to quench the tread so that the cooling curve of the tread portion passes a pearlite forming region in a continuous cooling transformation curve diagram and also passes on the longer time side than the martensitic transformation curve. Consequently, a process of interrupting or weakening the cooling operation at a stage before the temperature of the tread drops to the pearlitic transformation start temperature or at a stage before the temperature drops to the martensitic transformation start temperature is performed. By this process, (c) can be realized.

(e) By the combination of (a) to (d), deterioration in the heat-crack resistance can be suppressed and the wear resistance can be improved. Further, the region from the tread surface to the depth of 50 mm, which is required from the viewpoint of long life of the wheel, can have almost uniform hardness and the pearlitic structure.

The invention has been completed on the basis of the above knowledge.

A chemical composition of the steel used for a railway wheel (hereinbelow, simply referred to the steel for the wheel) of the invention, metallographic structure near the tread of the wheel of the invention, and quenching methods to obtain the structure will be specifically described hereinbelow. Hereinbelow, % of a chemical composition denotes % by weight.

Chemical Composition of the Steel for the Wheel

C: Carbon is an element necessary to form pearlite structure and to give preferable wear resistance to the wheel. When the C content is less than 0.4%, the wheel is remarkably worn. Therefore, 0.4% or more is necessary. However, when the C content exceeds 0.75%, cementite is deposited, so that toughness deteriorates and the heat-crack resistance is lowered. Consequently, the upper limit is determined to 0.75%.

Si: Silicon is effective to enhance the hardenability (thermal sensitivity). In the invention, Si is added for proper hardenability and for improving the wear resistance. In order to obtain the effect, 0.4% or more, preferably 0.6% or more of Si is necessary. However, when the Si content exceeds 0.95%, the structure after the quenching does not easily become pearlitic structure only, and the effect of improvement on the wear resistance is saturated. Thus, the upper limit is determined to 0.95%.

When the Si content is 0.4% or more, or 0.6% or more, since it is higher than approximately 0.25% of the Si content of the steel for the conventional wheel, it is concerned that the hardenability is too high. However, in the case of the invention, by the combination of the rather high hardenability and quenching methods, which will be described hereinbelow, the region from the tread surface to the depth of 50 mm can have the pearlitic structure and almost uniform hardness.

Mn: Manganese is an element for fixing S in the steel as MnS and for improving hot workability of the steel. In order to obtain the effect, 0.6% or more of Mn is necessary. On the other hand, when the content of Mn exceeds 1.2%, the effect is saturated, so that the upper limit is determined to 1.2%.

Cr: Chromium, like Si, has both the effect to enhance hardenability and the effect to enhance the wear resistance. From the viewpoint of suppressing an excessive increase in hardenability, the Cr content is determined to be less than 0.2%. Chromium is not always necessary for the steel for the wheel and may not be added.

However, Cr is an element exerting a subtle influence on the hardenability of the steel for the wheel, so it is preferable to contain a proper amount of Cr. The range is from 0.05% to less than 0.2%. Preferably, it is from 0.07% to not more than 0.15%. Phosphorus and sulfer are elements incidentally mixed from steels or the like. Phosphorus segregates microscopically. Sulfer forms sulfide inclusions. The segregation and nonmetallic inclusions deteriorate the toughness of the steel and harm the heat-crack resistance. Therefore, it is desirable to reduce them as much as possible. However, if the content of each of the elements is 0.03% or less, the influence is small. Consequently, each of the P content and the S content is determined to be 0.03% or less.

Ni: Nickel is effective to improve the toughness of the steel and also to enhance the hardenability. When Ni is included, the bainitic structure and martensitic structure are easily formed upon quenching, so there is a problem that the metallographic structures are apt to peel off. A scale generated when the steel is heated for forging in the manufacturing processes of the wheel is changed to a scale of a property difficult to be removed. The removal of the scale becomes consequently insufficient, and a serious problem such as increase in rejection rate occurs. In consideration of the above, the Ni content is desired to be low, preferably, about 0.1% or less.

Quenching Method of the Tread Portion of the Wheel and the Metallographic Structure:

In quenching methods to obtain the wheel of the invention, it is desirable to choose a cooling condition suitable to the invention on the basis of a diagram of a continuous cooling transformation curve of the steel of the wheel. A steel for a conventional wheel and its quenching method and a quenching method suitable for a steel for a wheel of the invention will be compared and described hereinbelow.

Figure 1A:
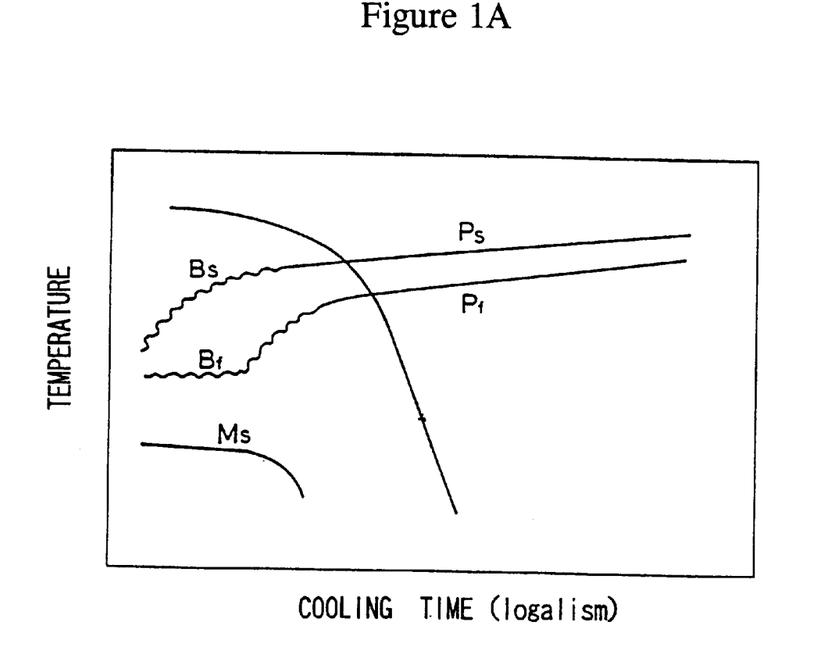
FIG. 1(a) shows a case where the hardenability is low and FIG. 1(b) shows a case where the hardenability is high.
Figure 1B:
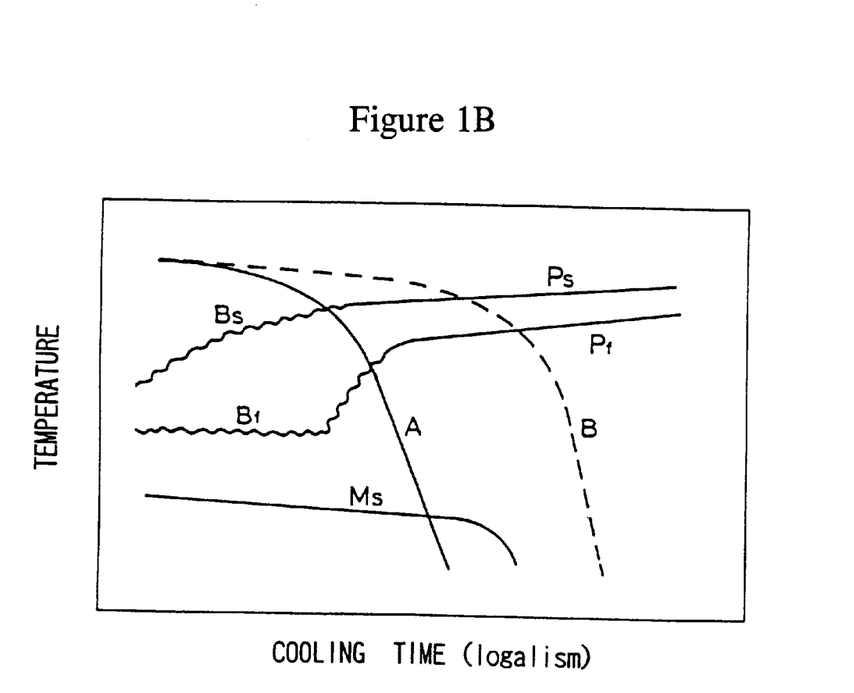

FIG. 1 is a diagram schematically showing the relation of a pearlitic transformation start curve Ps, a pearlitic transformation finish curve Pf, a bainitic transformation start curve Bs, a bainitic transformation finish curve Bf, a martensitic transformation start curve Ms, and a cooling curve of a steel for a conventional wheel. FIG. 1(a) shows a case of a steel for a wheel in which the Si content is approximately 0.25% and the hardenability is low and (b) shows a case of a steel for a wheel in which the Si content is about 1% and the hardenability is high.

When the Si content is low, the hardenability is low, so that the martensitic transformation region is narrow. Consequently, even if the cooling speed is fast to some extent, since the martensitic transformation does not easily occur, the pearlitic structure can be relatively easily obtained by the quenching operation. However, the steel for the wheel has problems such that sufficient hardness cannot be obtained in a region from the tread surface to a deep point due to the low hardenability as mentioned above and the hardness is not enough.

In case of the steel for the wheel having the high Si content, as it is obviously understood from FIG. 1(b), since the hardenability is high, the bainitic transformation region and the martensitic transformation region are wide. Consequently, the bainitic and martensitic structures tend to be formed (refer to a cooling curve A). In order to avoid the formation of martensite, when the cooling operation is performed on the condition of a cooling curve B having slow cooling speed in the diagram, the cooling curve is not close to the martensitic transformation curve Ms, so that sufficient hardness cannot be obtained. Further, when the wheel is used, martensite appears and there is a problem that heat-cracks occur easily.

Figure 2:
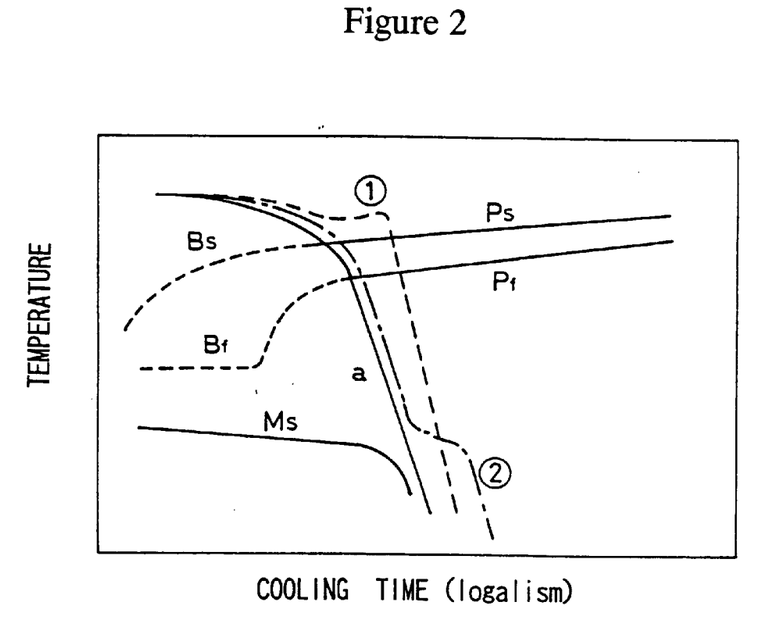
FIG. 2 is a diagram showing the relation between a transformation curve and a cooling curve of a steel for a wheel of the invention.

FIG. 2 shows the relation between a transformation curve and a cooling curve of the steel for the wheel of the invention. As it can be judged from a martensitic transformation region, the steel for the wheel of the invention is characterized in that the hardenability is intermediate between the two conventional steels for wheel shown in FIGS. (a) and (b). A cooling curve (a) in FIG. 9 shows a critical cooling curve causing no bainitic and martensitic transformation. The critical cooling curve (a) has an important meaning. With respect to the quenching condition of the invention, it is characterized in that a cooling condition close to the cooling curve (a) as much as possible on a longer time side of the cooling curve (a), especially, in an region near the martensitic transformation curve Ms is chosen.

By the choice of the cooling condition, the characteristics of the steel for the wheel of the invention are displayed more remarkably and the wheel as a target of the invention can be easily obtained. That is, when a cooling operation is executed on under conditions slightly on the right side from the cooling curve (a), bainite and martensite are hardly developed, and the pearlitic structure is obtained. There is a case where bainite is locally formed near the tread surface where the cooling speed is the fastest. Even if the bainitic structure of such a degree exists, it is allowed to exist since it can be machined in manufacturing processes of the wheel. The steel is hardest among steels having same pearlitic structures. Consequently, the wheel having both excellent heat-crack resistance and excellent wear resistance can be obtained. In addition, since the steel for the wheel of the invention has proper hardenability, a region from the tread to a relatively deep point can have the hardness close to that of the tread and the pearlitic structure. According to the combination of the chemical composition and the quenching condition of the steel for the wheel of the invention, the wheel of the invention includes a region from the tread surface to the depth of 50 mm having almost uniform hardness.

The continuous cooling transformation curve diagram of the steel for the wheel of the invention is obtained by using ordinary means for a cooling curve when a test piece is quenched, the metallographic structure, and thermal expansion measured in a cooling step. The critical curve (a) can be obtained from the continuous cooling transformation curve diagram. It is ideal to set the cooling condition on a slightly longer time side than the cooling curve (a). However, it is difficult to choose the cooling speed in an actual operation and the cooling curve tends to cross the bainitic transformation curve Bs and Bf or the martensitic transformation curve Ms.

FIG. 2 is a continuous cooling transformation curve diagram showing a cooling method suitable to embody the invention. The simplest way to embody in an actual operation is to decrease the temperature of the tread according to the cooling curve ①. A cooling speed in a temperature region until the start of pearlitic transformation is slow. After that, the cooling speed is increased, thereby enabling the cooling operation to be executed on the condition close to the critical cooling curve (a) without causing both of the bainitic and martensitic transformation. Means especially effective in the cooling method is to once interrupt the cooling operation in the cooling step. The means is extremely easy to execute in the actual operation and is also suitable when stable quality is managed. The cooling can be also interrupted before the martensitic transformation start temperature after the pearlitic transformation is finished, that is, on condition such as the cooling curve ② shown in FIG. 2. According to the quenching method, it is easy to prevent that the cooling curve crosses the martensitic transformation curve Ms.

The temperature of the tread portion basically denotes a temperature on the tread surface portion where the cooling speed is the fastest. However, it is difficult to measure or manage the surface temperature upon quenching in reality, the temperature in the region from the tread surface to a depth of few mm can be measured or managed in an actual operation.

In order to obtain the target metallographic structure and hardness, the relation of the cooling curve (cooling condition), metallographic structure, and hardness is preliminarily obtained for each steel, and a cooling curve, that is, a cooling condition according to the target metallographic structure and hardness is used.

EMBODIMENT

In order to confirm the effect of the invention, wheels made of steels of chemical compositions (examples of the invention) and those made of conventional steels of chemical compositions (examples of the comparison) were manufactured and are evaluated with respect to the heat-crack resistance and the wear resistance.

(A) Test Method

Table 1 shows chemical compositions of steels for wheels used in the embodiment. No. 1 and No. 2 wheels show the examples of the invention and No. 3 to No. 5 wheels show examples of the comparison.

TABLE 1

| Wheel No. | Chemical composition (% by weight)[1] | | | | | Quenching conditions[2][3] | | | |
|---|---|---|---|---|---|---|---|---|---|
| | C | Si | Mn | Cr | Ni | First cooling time | Interruption | Second cooling time | Sorting |
| 1 | 0.68 | 0.86 | 0.75 | 0.10 | 0.00 | Short | With | Long | Examples of the invention |
| 2 | 0.68 | 0.67 | 0.64 | 0.10 | 0.01 | Long | With | Short | |
| 3 | 0.65 | 0.26 | 0.73 | 0.11 | 0.02 | (No interruption) | | | Examples of the comparison |
| 4 | 0.67 | 1.00 | 0.78 | 0.10 | 0.01 | (Normalizing air-cooling from 850° C.) | | | |
| 5 | 0.88 | 0.59 | 0.77 | 0.45 | 0.03 | (No interruption) | | | |

[1] each of the P content and the S content is 0.030% or less
[2] quenching temperature is 860° C. The tempering temperature of the No. 1 wheel is 510° C., that of No. 2 is 470° C., that of No. 3 is 500° C., and that of No. 5 is 520° C.
[3] The amount of cooling water of the examples of the invention is the same in the first and second cooling
[4] Underlines denote that the FIGS. are out of the range specified in the invention.

The heat-crack resistance of the wheel was evaluated by the hardenability and the wear resistance was evaluated by a hardness distribution of a rim portion near the tread, a metallographic structure after the quenching, and a abrasive amount in an abrasion test. In the examinations, test pieces for hardenability were taken out from the wheels before quenching and test pieces for a wear test, metallographic structure observation, and rim portion hardness distribution measurement were taken out from heat-treated wheels by machining.

The diameter of the wheel is 1200 mm, the width of the rim is 145 mm, and the thickness of the rim is 65 mm. The quenching to the wheel was executed on conditions shown in Table 1 by using the device shown in FIG. 7. The quenching conditions are according to conditions most suitable to the steels, respectively. Therefore, with respect to the No. 4 wheel in which the hardenability is high since the Si content is high, a normalizing (the wheel is air-cooled from 850° C.) was performed. In the quenching condition shown in Table 1, the first cooling denotes a cooling before interruption during a cooling operation and the second cooling denotes cooling after the interruption. The amount of cooling water is constant in both of the first and second cooling steps.

The hardenability was examined by using a Jominy end quenching test piece for hardenability evaluation in which the diameter of the quenching end is 28 mm according to a Jominy end quenching test method specified by JIS G 0561.

The hardness distribution of the rim portion was examined by a method of measuring Rockwell hardness of a cut section in the radial direction parallel to the axle.

Figure 3:
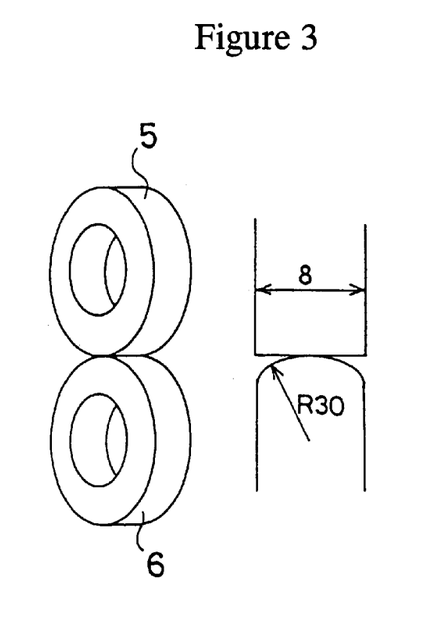
FIG. 3 is a diagram illustrating a test method of wear of a wheel.

The abrasive amount was examined by the following method. As shown in FIG. 3, outer peripheral portions of a ring-shaped wear test piece 5 for wear resistance evaluation and a rail material 6 (a carbon steel containing about 0.7% of C) having almost the same shape as the test piece 5 are pressed by 80 kgf. The test piece 5 has the outer diameter of 30 mm, the inner diameter of 17 mm and the thickness of 8 mm. The test piece 5 and the rail material 6 were rotated 500,000 revolutions on condition that a sliding ratio was 3%. After that, the abrasive amount of the test piece 5 was measured.

The metallographic structure was examined by a method of observing the section of the test piece used for the wear test by an optical microscope (at×100 magnification).

(B) Cooling Curve

Figure 4A:
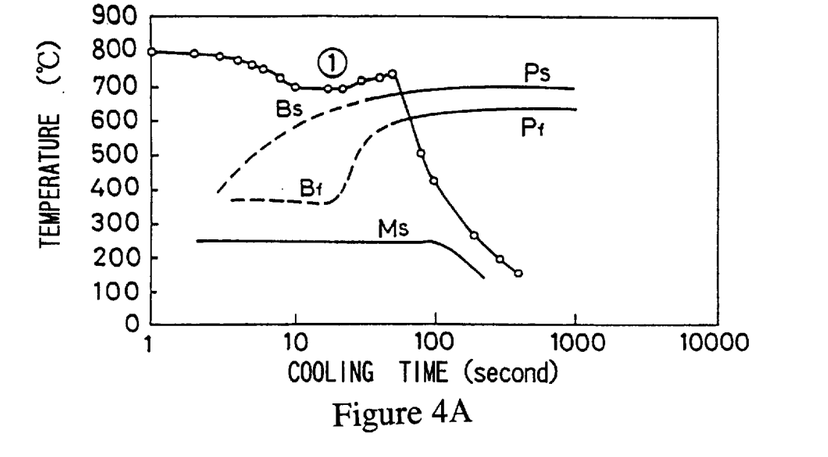
Figure 4B:
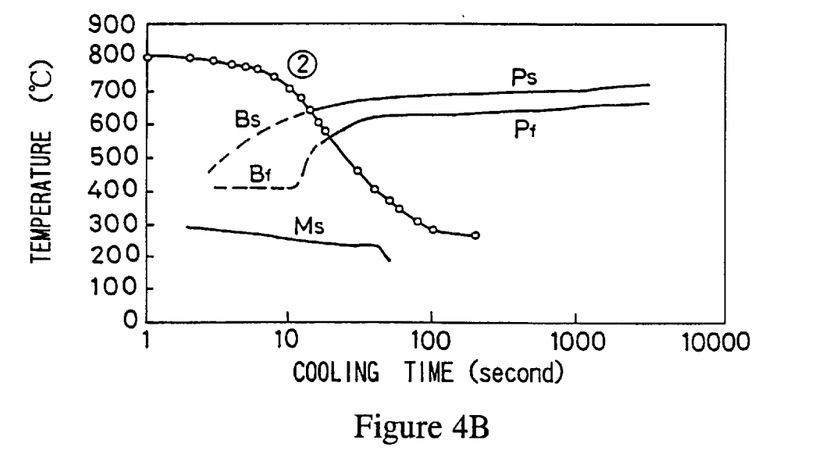
Figure 4C:
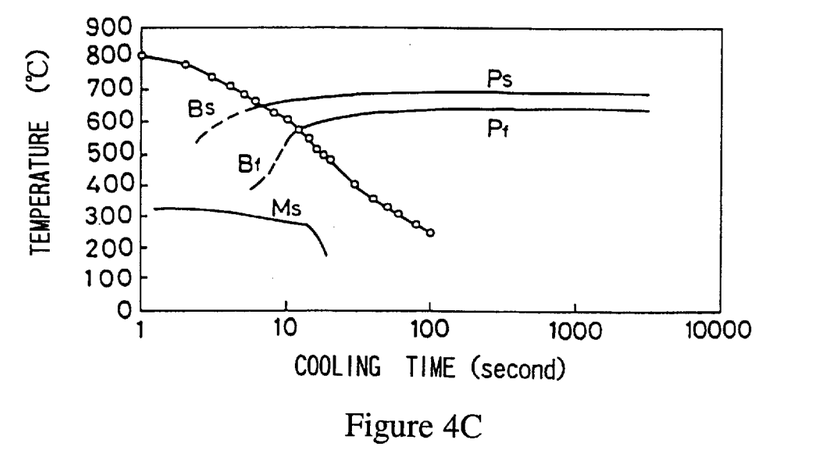

FIG. 4 shows results of the measurement of the relation between the cooling time and temperature upon quenching with respect to positions at a depth of 5 mm from the tread surface of each of the No. 1 to No. 3 wheels shown in Table 1. FIG. 4(a), (b), and (c) show cooling curves of the No. 1 to No. 3 wheels, respectively. In FIG. 4, the pearlitic transformation start curve Ps, the pearlitic transformation finish curve Pf, the bainitic transformation start curve Bs, the bainitic transformation finish curve Bf, and the martensitic transformation curve Ms are also shown.

The cooling of the No. 1 wheel relates to a case where the first cooling time is shortened and the cooling operation is interrupted before the pearlitic transformation is started. With respect to the No. 1 wheel, as obviously seen from the cooling curve ① shown in FIG. 4(a), the temperature in a position at a depth of 5 mm from the tread surface recuperates before the start of the pearlitic transformation. The cooling curve after completion of the pearlitic transformation is positioned slightly on the longer time side than the martensitic transformation curve Ms. Although a cooling curve at a deeper position is not shown, the cooling is delayed as compared with a shallow position, so that its cooling curve extends slightly on the longer time side than the cooling curve of the depth 5 mm.

With respect to the No. 2 wheel, since the first cooling time is long, the cooling was interrupted after completion of the pearlitic transformation. Therefore, the cooling curve ② shown in FIG. 4(b) is deviated to the long time side before it crosses the martensitic transformation curve Ms.

By the choice of the cooling conditions corresponding to the cooling curves ① and ②, the wheel of the invention has been cooled by avoiding to be bainitic or martensitic transformed and on the slightly longer time side than the critical cooling curve.

(C) Test Result

Figure 5:
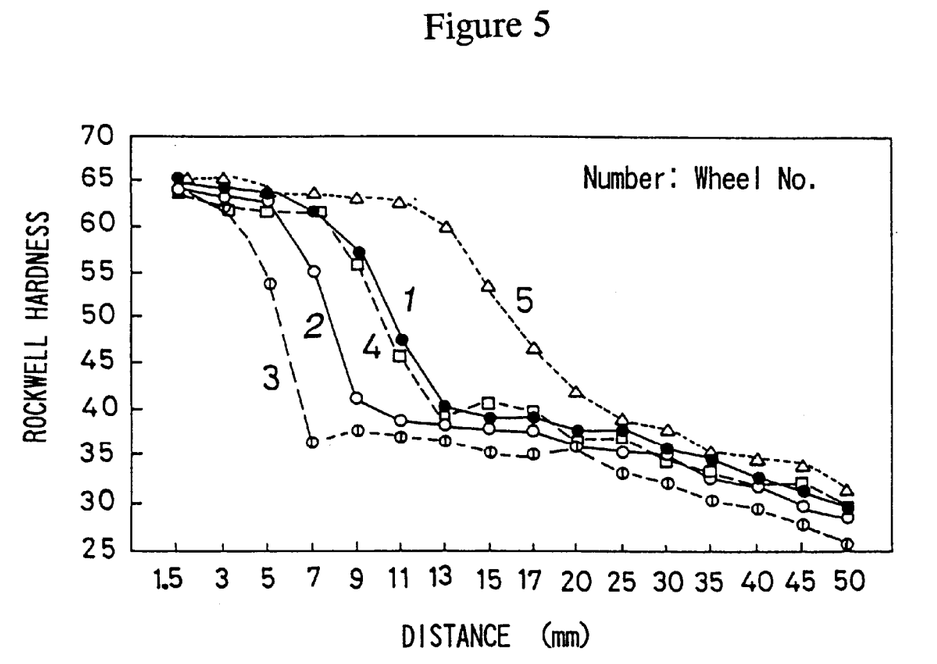
FIG. 5 is a graph showing the result of a Jominy end quenching test.

Table 2 shows the results of the examinations of the hardenability, metallographic structure, hardness, and abrasive amount of the wheels. FIG. 5 shows the result of the Jominy end quenching test and FIG. 6 shows the result of the Rockwell hardness distribution measurement of the section of the rim portion with respect to the No. 1 to No. 3 wheels.

TABLE 2

| Wheel No. | Hardenability*1 (mm) | Metallographic structure | Hardness*2 (HR) | Abrasive amount (g) | Sorting |
| --- | --- | --- | --- | --- | --- |
| 1 | 11.5 | Pearlite | 325 | 0.56 | Examples of |
| 2 | 8.3 | Pearlite | 340 | 0.66 | the invention |
| 3 | 5.7 | Pearlite | 312 | 0.75 | Examples of |
| 4 | 11.0 | Pearlite | 320 | 0.75 | the |
| 5 | 18.0 | Pearlite | 327 | 0.50 | comparison |

*1expressed by distance in a position of Rockwell hardness (HR)45 from the quenching end for convenience.
*2measurement values at the end face of the surface rim (at a position 25 mm from the tread surface).

As obviously understood from Table 2 and FIG. 5, the hardenability of the No. 1 and No. 2 wheels of the invention is higher than that of the No. 3 wheel as a comparison example and is lower than that of the No. 5 wheel. It is about medium for the steels for the conventional wheels. The hardenability of the No. 5 wheel having a high Cr content is abnormally high and it is understood that there is a problem regarding the heat-crack resistance.

The metallographic structure is pearlitic in every wheel.

With respect to hardness, there is no problem with the Rockwell hardness of the front surface of the rim end face (25 mm from the tread surface) shown in Table 2 except that the No. 3 wheel as a comparison example having a low Si content has rather low hardness. When the hardness distribution of the rim portion shown in FIG. 6 is observed, there is obviously a tendency that the hardness is low in the deep region from the tread, in which the cooling speed is slow.

Figure 6A:
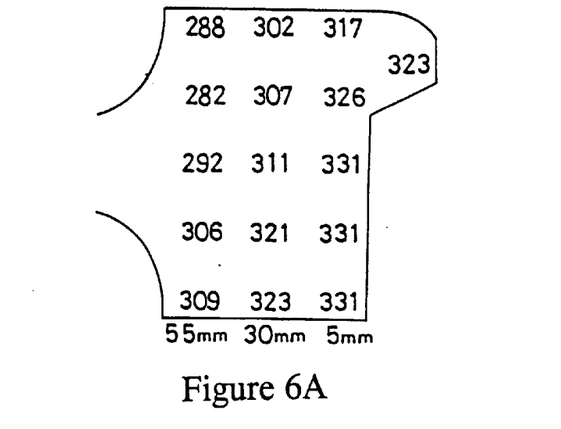
Figure 6B:
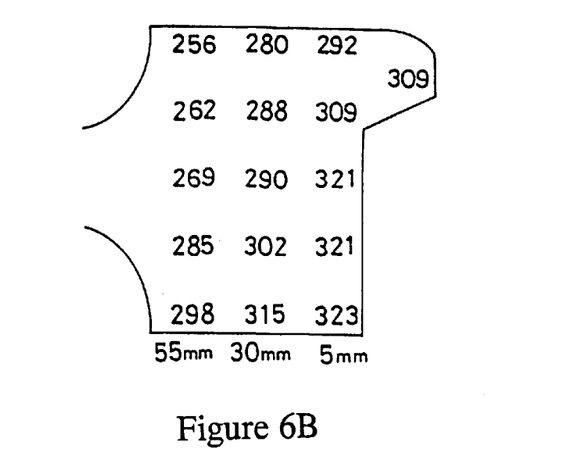
Figure 6C:
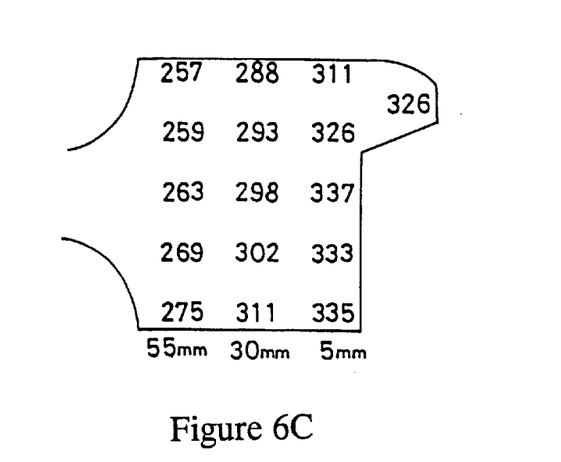

When differences between the maximum and minimum values of hardness were compared with respect to a range from the tread surface to the depth of 55 mm, it is 49 in the No. 1 wheel (FIG. 6(*a*)) of the example of the invention and it is 67 in the No. 2 wheel (FIG. 6(*b*)) of the example of the invention. On the contrary, it is 81 in the No. 3 wheel (FIG. 6(*c*)) as the comparison example, which is markedly larger than those of the examples of the invention. It is confirmed from the result that the hardness close to that of the rim can be obtained until the deep region as compared with the steel for the comparative wheel. This is because the hardenability is high in the examples of the invention as compared with that of the No. 3 wheel as the comparison example.

With respect to the abrasive amount, as shown in Table 2, the abrasive amount of each example of the invention is smaller than that of each of the No. 3 and No. 4 wheels as the comparison examples and it is understood that the wheels of the invention have higher wear resistance. Although the abrasive amount of the No. 5 wheel as the comparison example is small, the No. 5 wheel has a drawback that the hardenability is too high as mentioned above.

According to each of the wheels of the examples of the invention, since the hardenability is proper, the heat-crack resistance is excellent as mentioned above. Although it has the pearlitic structure, since the hardness is relatively high, it has excellent wear resistance as well. Further, since it has proper hardenability, the rim portion in which the range from the tread surface to the depth of about 50 mm has hardness almost like that of the tread can be obtained. Consequently, the life of the wheel is long when the wheel is reused by machining the tread in which the wear deformation, heat-crack, or the like occurs.

The performance of the wheel of the invention is further displayed by combining the chemical composition of the steel for the wheel of the invention and the quenching method of the invention.

As mentioned above, the wheel obtained by the manufacturing method of the invention was proved to have both of the heat-crack resistance and the wear resistance sufficiently good for the high-speed railway vehicle.

The railway wheels of the invention and the railway wheels obtained according to the manufacturing method of the invention have preferable heat-crack resistance and the wear resistance in the region from the tread surface of the wheel to a deep point such as a depth of about 50 mm. Consequently, not only fracture resistance is excellent but also the life is long, so that the safety of the wheel is improved and some steps necessary for maintenance can be reduced. Therefore, the wheels are especially suitable as the wheels for a recent high-speed railway vehicle and are extremely effective in the industrial world.

What is claimed is:

1. A solid railway wheel, which is made of the steel comprising the following chemical composition and which has pearlitic structure in a region of at least 50 mm in depth from the tread surface of the wheel,:

C: 0.4% to 0.75%

Si: 0.4% to 0.95%

Mn: 0.6% to 1.2%

Cr: less than 0.2%

P: 0.03% or less

S: 0.03% or less balance: Fe and incidental impurities wherein % means % by weight.

2. The railway wheel according to claim 1, wherein the content of Cr is 0.07% to 0.15% by weight.

3. The railway wheel according to claim 1, wherein the content of Si is 0.6% to 0.95% by weight.

4. The railway wheel according to claim 1, wherein the content of Si is 0.6% to 0.95% and the content of Cr is 0.05% to less than 0.2% by weight.

5. The railway wheel according to claim 1, wherein the content of Si is 0.6% to 0.95% and the content of Cr is 0.07% to 0.15% by weight.

6. The railway wheel according to claim 1, wherein the wheel has been formed by heating the steel and forging the steel into a shape of the railway wheel.

7. The railway wheel according to claim 1, wherein the steel includes 0.1% or less Ni.

8. The railway wheel according to claim 1, wherein the tread has substantially uniform hardness.

9. A method of manufacturing a railway wheel having the following composition, in weight %, 0.4% to 0.75% C, 0.4% to 0.95% Si, 0.6% to 1.2% Mn, less than 0.2% Cr, 0.03% or less P, 0.03% or less S, balance Fe and incidental impurities, the process comprising quenching a tread portion of the wheel by a continuous cooling process including the following steps (1) and (2):

(1) interrupting or weakening a cooling operation at a stage before the temperature of the tread portion of the wheel drops to a pearlitic transformation start temperature in a continuous cooling transformation curve diagram; and (2) further cooling.

10. A method of manufacturing a railway wheel having the following composition, in weight %. 0.4% to 0.75% C, 0.4% to 0.95% Si, 0.6% to 1.2% Mn, less than 0.2% Cr, 0.03% or less P, 0.03% or less S, balance Fe and incidental impurities, the process comprising quenching a tread portion of the wheel by a continuous cooling process including the following steps (1), (2), and (3):

(1) cooling on condition that a cooling curve of the tread portion of the wheel passes a pearlite formation region in a continuous cooling transformation curve diagram;

(2) interrupting or weakening a cooling operation at a stage before the temperature of the tread portion of the wheel drops to a martensitic transformation temperature; and (3) further cooling.

11. A solid railway wheel which is made of the steel comprising the following chemical composition and which has pearlitic structure in a region of at least 50 mm in depth from the tread surface of the wheel:

C: 0.4% to 0.75%

Si: 0.4% to 0.95%

Mn: 0.6% to 1.2%

Cr: less than 0.2%

P: 0.03% or less

S: 0.03% or less balance: Fe and incidental impurities wherein % means % by weight, the steel including Cr and Si contents which provide the pearlitic strucrure.

12. A solid railway wheel which is made of the steel comprising the following chemical composition and which has pearlitic structure in a region of at least 50 mm in depth from the tread surface of the wheel:

C: 0.4% to 0.75%

Si: over 0.5% to 0.95%

Mn: 0.6% to 1.2%

Cr: less than 0.2%

P: 0.03% or less

S: 0.03% or less balance: Fe and incidental impurities wherein % means % by weight the steel includes over 0.5% Si.

* * * * *